United States Patent Office 3,457,228
Patented July 22, 1969

3,457,228
POLYMERIZATION OF TRIOXANE
WITH POLYACETALS
Edgar Fischer, Frankfurt am Main, and Claus Schott, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Oct. 27, 1966, Ser. No. 589,796
Claims priority, application Germany, Nov. 6, 1965, F 47,612
Int. Cl. C08g 1/14, 1/12
U.S. Cl. 260—67                 4 Claims

ABSTRACT OF THE DISCLOSURE

Copolyacetals are disclosed which are characterized by the fact that their melt indices exhibit a high degree of pressure dependence, i.e., there is a sharp increase in melt index with increasing pressure. This property renders them especially useful for injection molding applications. The copolyacetals may be prepared by copolymerizing 98 to 80% by weight of trioxane, optionally 0 to 10% by weight of a cyclic ether and from 0.05 to 10% by weight of a prepolymer obtained by reacting 1 mole of a 1,2,(5-11)-triol with 0 to 1 mole of an alpha-omega-diol of a molecular weight within the range of 62 to 1,000, 0 to 1 mole of a monohydric alcohol with 1 to 11 carbon atoms and 1 mole of formaldehyde for each two moles of OH groups of the reaction mixture. Polymerization may be effected in the presence of a cationic catalyst at a temperature within the range −50° C. to +100° C.

---

The present invention relates to copolyacetals and a process for their manufacture.

It has been proposed to prepare high molecular weight polymers containing recurrent oxymethylene units by polymerization of formaldehyde or trioxan. According to another proposed method, heat resistant polyacetals are obtained by copolymerizing trioxan with saturated cyclic ethers, for example, glycol formal or ethylene oxide. Such products are predominantly used for injection moulding. It has furthermore been proposed to make copolymers of trioxan, cyclic ethers and compounds containing two polymerizable groups, for example butanedioldiglycidyl ether.

We have now found that copolymers of trioxan, a cyclic ether and a prepolymer of a molecular weight within the range of 176 to 2000 can be obtained in an advantageous manner by polymerizing a comonomer mixture of 98 to 80% by weight of trioxan, 0 to 10% by weight of a cyclic ether and 0.05 to 10% by weight of a prepolymer obtained from 1 mole of a 1,2,(5-11)-triol, 0 to 1 mole of an α-ω-diol of a molecular weight within the range of 62 to 1000, 0 to 1 mole of a monohydric alcohol with 1 to 11 carbon atoms and 1 mole of formaldehyde for each 2 moles of OH groups of the reaction mixture.

It is preferable to use a cyclic ether having the formula

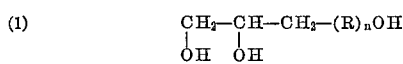

in which $R_1$, $R_2$, $R_3$ and $R_4$ each represents a hydrogen atom or an alkyl group which may be subsituted by one or more halogen atoms; and in which $R_5$ stands for a methylene or an oxymethylene radical which may be substituted by an alkyl group which may be substituted by one or more halogen atoms and $n$ represents 0, 1, 2 or 3, or in which $R_5$ represents the grouping $$-(O-CH_2-CH_2)_m-OCH_2-$$

and $n$ is 1 and $m$ is 1, 2 or 3. The above mentioned alkyl groups contain 1 to 5 carbon atoms and may be substituted by up to 3 halogen atoms, advantageously chlorine atoms.

As cyclic ether it is especially advantageous to use ethylene oxide, glycol formal or diglycol formal. Alternatively, there may be used, for example propylene oxide, epichlorohydrin or 4-chloromethyl dioxolane. A cyclic ether is advantageously used if the prepolymer is used in an amount of less than 2%.

The prepolymers are obtained by reaction of formaldehyde with at least a 1,2,(5-11)-triol. For the manufacture of the prepolymer there may furthermore be used an α-ω-diol of a molecular weight within the range of 62 to 1,000 and an aliphatic or alicyclic monohydric alcohol with 1 to 11 carbon atoms. The mono-, di- and trihydric alcohols may be interrupted by 1 to 3 ether oxygen atoms.

For the manufacture of the prepolymer the following proportions are advantageously used:

(1) 1 mole of triol, 1.5 moles of formaldehyde
(2) 1 mole of triol, 0.5 mole of diol, 2 moles of formaldehyde
(3) 1 mole of triol, 1 mole of monohydric alcohol, 2 moles of formaldehyde
(4) 1 mole of triol, 1 mole of diol, 1 mole of monohydric alcohol, 3 moles of formaldehyde.

As tri-, di- and monohydric alcohols, compounds of the following formulae ar advantageously used:

(1)        

in which R stands for $CH_2-$ or $-O-(CH_2)_m-$, $n$ is a whole number within the range of 1 to 8 and $m$ is a whole number within the range of 2 to 6.

(2)        $HO(R_n-O)_mH$ in which R stands for $-CH_2-$, $n$ is a whole number within the range of 2 to 8 and $m$ is a whole number within the range of 1 to 16.

(3)        $H(R)_nOH$ in which R stands for $-CH_2-$ or one of the groupings $$-(CH_2)_m-O-(CH_2)_m-$$

and

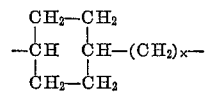

and $m$ is a whole number within the range of 2 to 6, $n$ is a whole number within the range of 1 to 10 and $x$ is zero or a whole number within the range of 1 to 4, or the homologues thereof.

Examples of suitable compounds are the following:

(1) trihydric alcohols: pentanetriol-1,2,5; hexanetriol-1,2,6; 4 - oxahexanetriol - 1,2,6; 4,7 - dioxanonanetriol-1,2,9; undecanetriol-1,2,11;
(2) dihydric alcohols: ethylene glycol; ethylene diglycol; ethylene triglycol; ethylene hexaglycol; polyglycol (molecular weight 1000); butanediol - 1,4; 5 - oxanonanediol - 1,9; hexanediol - 1,6; decanediol - 1,10;
(3) monohydric alcohols: methanol, ethanol, hexanol, cyclohexanol, monoethyl ether of ethylene glycol, monoethyl ether of diethylene glycol.

The prepolymers are obtained by condensation of the starting components in the presence of acid ion exchangers, for example polystyrenesulfonic acids, with removal of the reaction water. Only the lowest members of the prepolymers can be distilled. Since the catalyst is removed by filtration, the prepolymers can be used for the polymerization without having been distilled.

The use of these prepolymers renders it possible to obtain polyacetal resins that are distinguished especially by their melt visocisity depending strongly on the pressure as is demanded of products that are well suitable for processing on injection moulding machines.

The polymerization may be carried out according to known methods, i.e. in substance, in solution or in suspension. As a solvent it is advantageous to use inert aliphatic or aromatic hydrocarbons, halogenated hydrocarbons or ethers. The polymerization in substance takes a particularly smooth course. Depending on the solvent chosen, the polymerization is carried out at a temperature within the range of −50 to +100° C.

The polymerization is initiated by a cationic catalyst known in itself. Examples of suitable catalysts are organic or inorganic acids, acid halides and particularly Lewis acids (cf. Kortüm, Lehrbuch der Elektrochemie, Wiesbaden, 1948, pp. 300 and 301). Of the latter, boron fluoride and its complex compounds, for example boron trifluoride etherates, are advantageously used. Particularly suitable are the diazonium fluoroborates disclosed in Belgian Patents Nos. 593,648 and 618,213 or the compounds described in Belgian Patent No. 585,980.

The concentration of the catalyst may vary within wide limits and depends on the nature of the catalyst and the desired molecular weight of the polymer. The concentration of the catalyst may be within the range of 0.0001 and 1% by weight, advantageously within the range of 0.001 to 0.1% by weight, calculated on the monomer mixture.

Since the catalysts suitable for use in the process of the invention tend to decompose the polymer, the catalysts are advantageously rendered inert immediately after the polymerization, for example, by the use of ammonia or amine solutions.

The removal of unstable terminal semi-acetal groups may be carried out in a manner proposed for other copolymers. Advantageously, the polymer is suspended in aqueous ammonia at a temperature within the range of 100° C. to 200° C., in the presence of a swelling agent, for example, methanol or n-propanol, if desired. It is also possible to dissolve the polymer in a medium having an alkaline reaction at a temperature above 100° C. and then to reprecipitate the polymer. As solvent, there may be used, for example, benzyl alcohol, ethylene glycol monoethyl ether or a mixture of 60% methanol and 40% water. As compound having an alkaline reaction, ammonia or an aliphatic amine may be used.

The stabilization of the polymer against heat, light and oxygen may be carried out in the manner proposed for other trioxan co- and terpolymers. Exemplary of suitable heat stabilizers are polyamides, amides of polybasic carboxylic acids, amidines and urea compounds. As oxidation stabilizers, phenols, preferably bisphenols, and aromatic amines may be used. α-Oxybenzophenone derivatives make suitable light stabilizers.

The copolymers obtained by the process of the invention can advantageously be used for the manufacture of articles having a large surface area by injection moulding, particularly for injection moulding in multi-cavity moulds with runners of narrow internal diameter, furthermore for extrusion processes as well as for the manufacture of sheets, films and fibers.

The following examples serve to illustrate the invention, but are not intended to limit it.

EXAMPLE 1

A comonomer mixture comprising 100 g. of freshly distilled liquid trioxan, 2 g. of ethylene oxide and 0.9 g. of a prepolymer of formaldehyde, hexanetriol-1,2,6 and n-hexanol in a molar ratio of 2:1:1 which had been obtained in the presence of an acid ion exchanger with azeotropic removal of the reaction water with the use of cyclohexane, was polymerized in the presence of 100 mg. of p-nitrophenyl diazonium fluoroborate as the catalyst in a screw-top glass bottle at a temperature maintained by a thermostat at 70° C. After the polymerization had been terminated, the block of polymer was comminuted, ground and then homogeneously hydrolysed for 30 minutes at 150° C. in 1 liter of benzyl alcohol in the presence of 10 cc. of ethanolamine. After hydrolysis, the product was boiled with methanol, washed and dried. The yield of stable polymer was 82 g. The melt indices measured according to ASTM–D1238–52T were $i_2=11$ and $i_{20}=700$. The ratio $i_{20}/i_2$, which is an important measure of the dependence of the melt viscosity on the pressure, was 64.

EXAMPLE 2

A comonomer mixture comprising 100 g. of trioxan and 5 g. of a prepolymer which had been obtained from formaldehyde, pentanetroil-1,2,5 and ethyl diglycol in a molar ratio of 2:1:1 as described in Example 1, was polymerized in the presence of 15 mg. of p-nitrophenyl diazonium fluoroborate and hydrolysed as described in Example 1. The melt indices were $i_2=15$ and $i_{20}=1280$.

EXAMPLE 3

A comonomer mixture comprising 100 g. of trioxan, 3 g. of dioxolane and 0.5 g. of a prepolymer of formaldehyde, hexanetriol-1,2,6 and polyglycol (1000 units) in a molar ratio of 4:2:1 was polymerized in the presence of 15 mg. of p-nitrophenyl diazonium fluoroborate and hydrolysed as described in Example 1. The yield of stable polymer was 76 g. The melt indices were $i_2=6.5$ and $i_{20}=310$.

EXAMPLE 4

A comonomer mixture comprising 100 g. of trioxan, 2 g. of ethylene oxide and 7 g. of a prepolymer of formaldehyde and 4.7-dioxanonanetriol-1,2,9 in a molar ratio of 3:2 was polymerized in the presence of 15 mg. of pi-nitrophenyl diazonium fluoroborate and hydrolysed as described in Example 1. The melt indices of the polymer so obtained were $i_2=8.4$ and $i_{20}=1607$. The ratio $i_{20}/i_2$ was 191.

What is claimed is:

1. In a process for the manufacture of coplymers of trioxane, cyclic ethers and prepolymers in the presence of a cationic catalyst at a temperature within the range of −50° to +100° C. the improvement which comprises polymerizing a comonomer mixture of 98 to 80% by weight of trioxane, 0 to 10% by weight of a cyclic ether of the formula

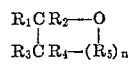

in which $R_1$, $R_2$, $R_3$ and $R_4$ each represents a hydrogen atom or an alkyl group which may be substituted by one or more halogen atoms; and in which $R_5$ stands for a methylene or an oxymethylene radical which may be substituted by an alkyl or haloalkyl group and $n$ represents 0 to 3, or in which $R_5$ represents the grouping $-(O-CH_2-CH_2)_m-OCH_2-$ and $n$ is 1 and $m$ is 1 to 3 and 0.05 to 10% by weight of a prepolymer of a molecular weight within the range of 176 to 2,000 which has been obtained by reacting 1 mole of a 1,2,(5-11)-triol, 0 to 1 mole of an alpha-omega-diol of a molecular weight within the range of 62 to 1,000, 0 to 1 mole of a monohydric alcohol with 1 to 11 carbon atoms and 1 mole of formaldehyde for each 2 moles of OH groups of the reaction mixture.

2. A process for the manufacture of copolymers of trioxan, cyclic ethers and prepolymers in the presence of a cationic catalyst at a temperature within the range of −50° C. to +100° C. which comprises polymerizing a comonomer mixture of 98 to 80% by weight of trioxan, 0 to 10% by weight of a cyclic ether of the following formula

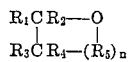

in which $R_1$, $R_2$, $R_3$ and $R_4$ each represent a hydrogen atom or an alkyl group which may be substituted by one or more halogen atoms; and in which $R_5$ stands for a methylene or an oxymethylene radical which may be substituted by an alkyl group which may be substituted by one or more halogen atoms and $n$ represents 0, 1, 2 or 3, or in which $R_5$ represents the grouping $$-(O-CH_2-CH_2)_m-OCH_2-$$

and $n$ is 1 and $m$ is 1, 2 or 3, and 0.05 to 10% by weight of a prepolymer of a molecular weight within the range of 176 to 2000 which has been obtained from 1 mole of a 1,2,(5-11)-triol of the following formula

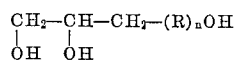

in which R stands for $-CH_2-$ or $-O-(CH_2)_m-$, $n$ is a whole number within the range of 1 to 8 and $m$ is a whole number within the range of 2 to 6, 0 to 1 mole of an α-ω-diol of a molecular weight within the range of 62 to 1,000, having the following formula $$HO(R_n-O)_mH$$

in which R stands for $-CH_2-$, $n$ is a whole number within the range of 2 to 8 and $m$ is a whole number within the range of 1 to 16, 0 to 1 mole of a monohydric alcohol of the following formula $$H(R)_nOH$$

in which R stands for $-CH_2-$ or one of the groupings $$-(CH_2)_m-O-(CH_2)_m-$$

and

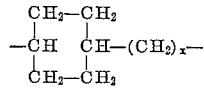

$m$ being a whole number within the range of 2 to 6, $n$ being a whole number within the range of 1 to 10 and $x$ being zero or a whole number within the range of 1 to 4, and 1 mole of formaldehyde for each 2 moles of OH groups of the reaction mixture.

3. A process for the manufacture of copolymers of trioxan, cyclic ethers and prepolymers in the presence of a cationic catalyst at a temperature within the range of −50° C. to +100° C. which comprises polymerizing a comonomer mixture of 98 to 80% by weight of trioxan, 0 to 10% by weight of ethylene oxide, glycol formal, diglycol formal, propylene oxide, epichlorhydrin or 4-chloromethyl dioxolane, and 0.05 to 10% by weight of a prepolymer of a molecular weight within the range of 176 to 2000 which has been obtained from 1 mole of pentanetriol-1,2,5; hexanetriol-1,2,6; 4-oxahexanetriol-1,2,6; 4,7-dioxanonanetriol-1,2,9 or undecanetriol-1,2,11; 0 to 1 mole of ethylene glycol, ethylene diglycol, ethylenetriglycol, ethylene hexaglycol, a polyglycol of a molecular weight of 1000, butanediol-1,4; 5-oxanonanediol-1,9; hexanediol-1,6 or decanediol-1,10; 0 to 1 mole of methanol, ethanol, hexanol, cyclohexanol, ethyl glycol or ethyl diglycol and 1 mole of formaldehyde for each 2 moles of OH groups of the reaction mixture.

4. Copolymers consisting essentially of units derived from 98 to 80% by weight of trioxane, 0 to 10% by weight of a cyclic ether of the following formula

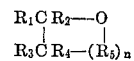

in which $R_1$, $R_2$, $R_3$ and $R_4$ each represents a hydrogen atom or an alkyl group which may be substituted by one or more halogen atoms; and in which $R_5$ stands for a methylene or an oxymethylene radical which may be substituted by an alkyl group which may be substituted by one or more halogen atoms and $n$ represents 0 to 3, or in which $R_5$ represents the grouping $$-(O-CH_2-CH_2)_mOCH_2-$$

and $n$ is 1 and $m$ is 1 to 3, and 0.05 to 10% by weight of a prepolymer of a molecular weight within the range of 176 to 2000, said prepolymer consisting essentially of units derived from 1 mole of a 1,2,(5-11)-triol of the following formula

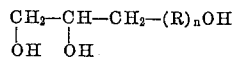

in which R stands for $-CH_2-$ or $-O-(CH_2)_m-$, $n$ is a whole number within the range of 1 to 8 and $m$ is a whole number within the range of 2 to 6, 0 to 1 mole of an alpha-omega-diol of a molecular weight within the range of 62 to 1000, having the following formula $$HO(R_n-O)_mH$$

in which R stands for $-CH_2-$, $n$ is a whole number within the range of 2 to 8 and $m$ is a whole number within the range of 1 to 16, 0 to 1 mole of a monohydric alcohol of the following formula $$H(R)_nOH$$

in which R stands for $-CH_2-$ or one of the groupings $$-(CH_2)_m-O-(CH_2)_m-$$

and

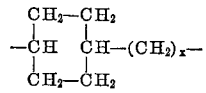

$m$ being a whole number within the range of 2 to 6, $n$ being a whole number within the range of 1 to 10 and $x$ being 0 to 4 and 1 mole of formaldehyde for each 2 moles of OH groups of the reaction mixture.

References Cited

UNITED STATES PATENTS

| | | | |
|---|---|---|---|
| 2,786,081 | 3/1957 | Kress | 260—615 |
| 3,027,352 | 3/1962 | Walling et al. | 260—67 |
| 3,256,246 | 6/1966 | Gutweiler et al. | 260—67 |
| 3,264,266 | 8/1966 | Merten et al. | 260—73 |

WILLIAM H. SHORT, Primary Examiner

L. M. PHYNES, Assistant Examiner

U.S. Cl. X.R.

260—823